Figure 1:
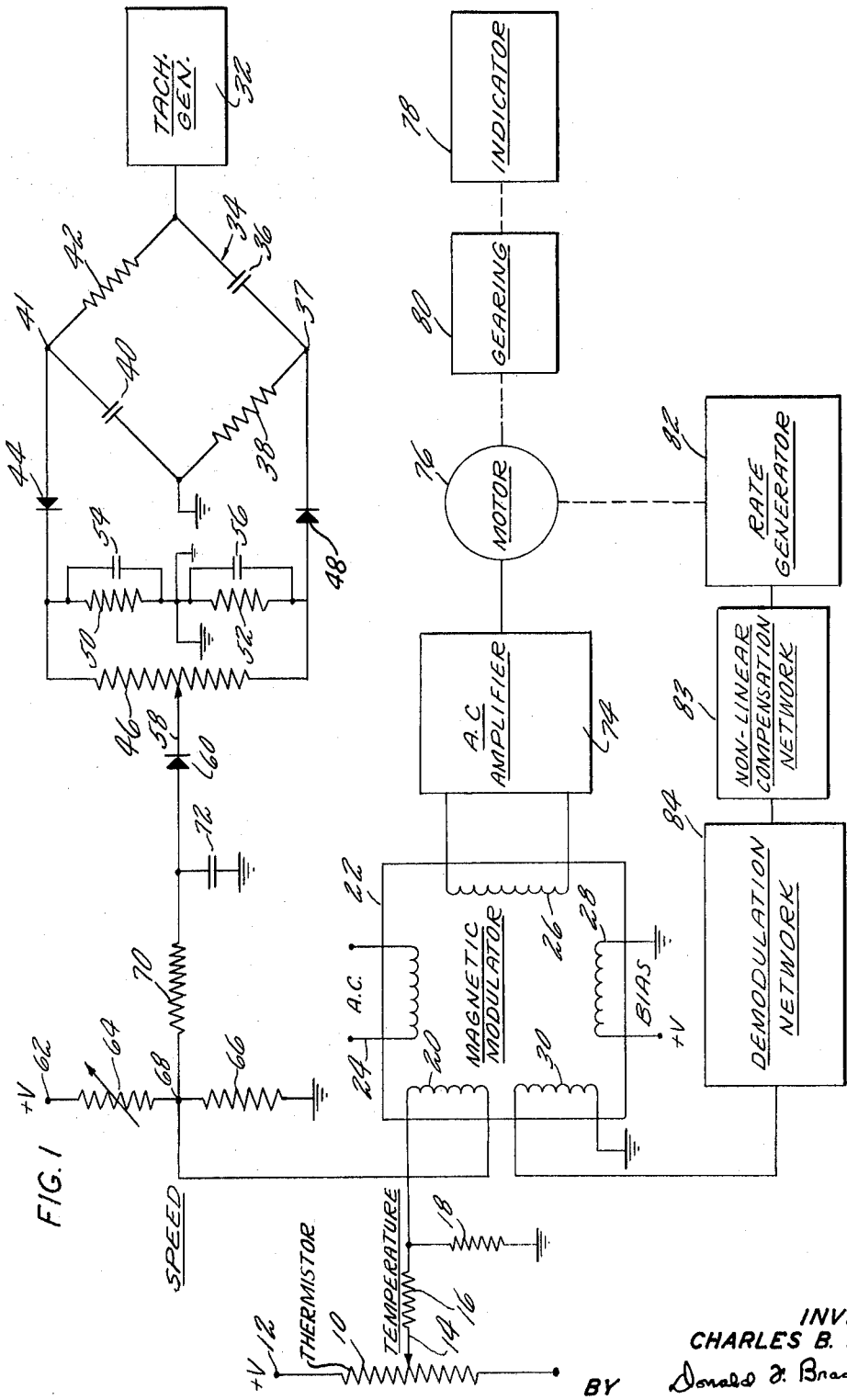

INVENTOR
CHARLES B. BRAHM
BY Donald J. Bradley
AGENT

United States Patent Office 3,250,901
Patented May 10, 1966

3,250,901
TIME TEMPERATURE RECORDER FOR TURBOJET ENGINES
Charles B. Brahm, Ellington, Conn., assignor to United Aircraft Corporation, East Hartford, Conn., a corporation of Delaware
Filed Apr. 20, 1962, Ser. No. 189,136
4 Claims. (Cl. 235—183)

This invention relates to a system for automatically indicating the exact time at which a turbojet engine should be overhauled. In particular a novel system and apparatus are disclosed in which the cumulative overtemperature occurring in a turbojet engine is automatically recorded as a function of the engine speed.

The modern, high speed turbojet engine used in aircraft has a service operational life which can, under ordinary conditions, be predicted to some fair degree of accuracy. The concept of "ordinary" conditions must be discarded, however, when dealing with the problems created by operation of the engine above the temperature limits set by the manufacturer and military standards.

The basic difficulty is brought about by the requirements of high-performance aircraft, namely, the demand for high thrust performance from the engine. This, in turn, dictates that the power-plant be operated as close as possible to its safe temperature limit. Since overtemperatures, whether intentional or inadvertent, are to be expected under such conditions, the service life of the engine can suffer seriously. Regular overhaul periods have been established for most jet engines in operational use but some must be overhauled prematurely or even scrapped because of the damage caused by overtemperature operation for too long a period of time. This damage is primarily noticed as excessive growth, or creep, of the hot parts of the engine due to the combined influence of high temperature and high stress.

Since it is generally known how long a jet engine, of a given type, can operate at a given exhaust temperature before overhaul becomes necessary, a temperature-time curve can be plotted which defines this relationship for a particular turbine speed. This curve will be different for any given turbine speed since the stress on the hot parts of the engine varies approximately as the square of the speed. In addition, the difference between the temperature of the exhaust gases and the actual temperature of the turbine wheel also increases with the speed of the engine. These direct relationships between speed and stress in one case, and speed and temperature difference in the other, tend to increase the time-temperature limits to engine operation with a decrease in speed.

This invention comprises a small, light-weight computing instrument which takes the above factors into consideration and presents to the pilot and ground maintenance crew of the aircraft a positive indication of engine operation in the over-temperature region. In particular a voltage is produced in proportion to engine temperature, and is compared with another voltage which is a function of engine speed. The resultant signal is amplified and fed to a motor. The motor is connected through a gear reduction unit to an indicator which produces a cumulative record of engine operation in excess of rated conditions. Rate feedback is used to stabilize the system. The temperature and speed voltages, the gain of the amplifier and rate feedback network, and the gear reduction ratio may be varied in accordance with specific engine characteristics.

It is therefore an object of this invention to provide a simple and inexpensive automatic system and apparatus for indicating the time at which a turbojet engine should be overhauled.

Another object of this invention is a novel system for monitoring the overtemperature operation of a turbojet engine.

A further object of this invention is an electronic apparatus which automatically produces a cumulative indication of overtemperature operation in a turbojet engine as a function of the speed of the engine.

Another object of this invention is an electronic recorder for use with turbojet engines which automatically produces a cumulative record of engine operation in excess of rated conditions.

A further object of this invention is a novel system for computing and indicating the expected creep of hot parts in a turbojet engine which result because of high engine temperature and stress.

Figure 2:
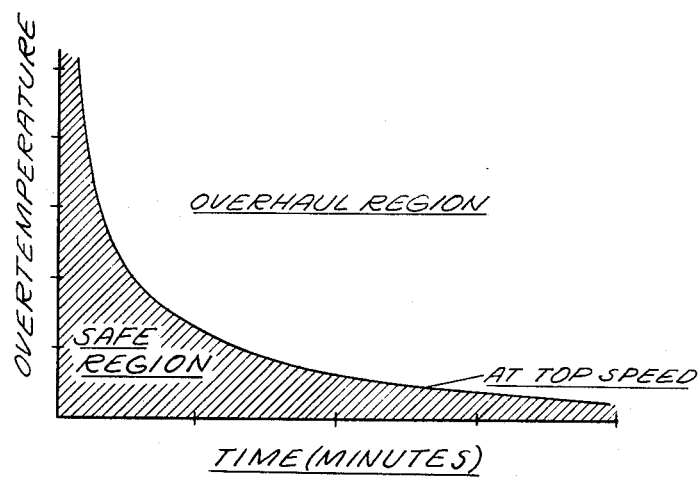
Figure 3:
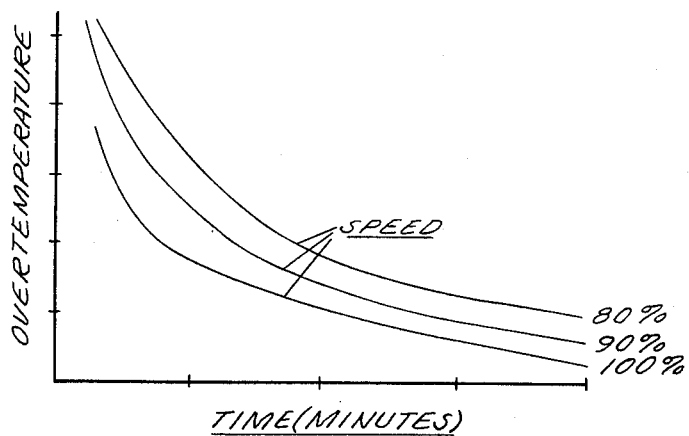
Figure 4:
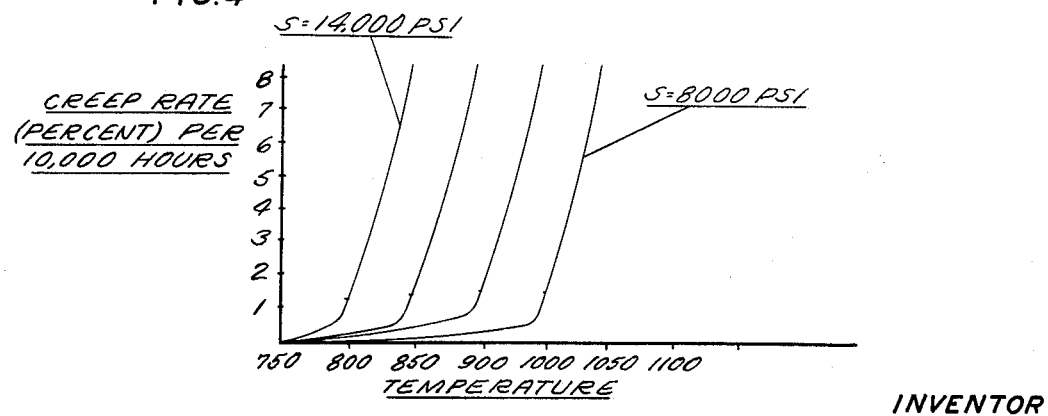

These and other objects and a fuller understanding of the invention may be had by referring to the following description and claims, taken in conjunction with the following diagram in which:

FIGURE 1 is a schematic representation, partially in block diagram form, of the preferred embodiment for the time-temperature recorder of this invention; and FIGURE 2 is a graphical representation of the relationship between engine overtemperature and the time before overhaul is required at a fixed engine speed; and FIGURE 3 shows a family of curves which indicate the relationship between engine overtemperature and the time before overhaul is required at varying engine speeds; and FIGURE 4 shows graphically the variation of the creep rate of carbon steel as a function of temperature and stress.

Referring now to the drawings, FIGURE 2 shows, for a particular engine speed, typical jet engine characteristics of overtemperature versus the time at which the engine can operate at an overtemperature condition before overhaul is required. Thus, for a small overtemperature, a longer time of operation can be tolerated before overhaul is required. As the overtemperature becomes larger, the safe operating time becomes shorter.

FIGURE 3 shows how the characteristics of temperature versus time of FIGURE 2 varies with engine speed. A family of curves exist, the particular curve being determined by the engine speed at the time. As is apparent from the figures, an engine will be able to operate at an overtemperature condition for a longer time when the engine speed is low, than it will when the speed is high, before overhaul is required.

FIGURE 4 shows the variation of the creep rate of carbon steel as a function of temperature and stress. The stress varies as the square of the speed, so that the curves may be said to show creep rate for carbon steel versus temperature at varying speeds. Carbon steel is used in many jet engine components and is representative of the materials used in showing the effect of temperature and stress upon creep rate.

It should be noted that the curves given in the figures are merely by way of example, since the actual curves vary with the particular engine and with environmental conditions. The engine manufacturers ordinarily can provide the curves for the engine.

FIGURE 1 shows schematically the operation of one embodiment of the time-temperature recorder. A voltage proportional to the temperature of the engine is produced by means of a temperature sensitive element such as thermistor 10 having a resistance which varies with temperature fed by a voltage source 12. An adjustable arm 14 is provided to vary the portion of the voltage picked off from thermistor 10 and adjust the range of the voltage. The temperature sensed may be that of the tailpipe of the engine, or the turbine temperature itself. If tailpipe temperature is sensed, it may be necessary to correct the signal to account for variable ambient temperature conditions. The temperature sensing element may also be a thermocouple or any other device which will produce a voltage proportional to the engine temperature. In many aircraft such a temperature sensitive element is already present for use in fuel controls or for providing to the pilot an indication of engine temperature. In these cases it is not necessary to install another temperature sensing device.

The temperature varying voltage is fed through a voltage dividing network comprising series resistor 16 and parallel resistor 18. Resistor 16 is generally much larger than resistor 18, and the network provides the proper voltage to the control winding 20 of magnetic modulator 22.

Modulator 22 is a well-known type of saturable reactor in which a D.C. signal is fed to the modulator control winding 20 while a constant amplitude A.C. signal of fixed frequency is fed to the modulator exciter winding 24. The A.C. signal is modulated in amplitude in accordance with the amplitude of the D.C. control signal and is sensed by output winding 26. Bias winding 28 is provided with a constant D.C. signal which biases the magnetic material of the modulator to a preselected operating point on its hysteresis curve and fixes the point about which variations take place to some value other than zero. An additional winding, feedback winding 30, operates similarly to control winding 20, the feedback signal being D.C. and of opposite polarity to the control signal as in typical negative feedback loop operation.

The signal applied to control winding 20 is produced by comparing the temperature varying voltage with a voltage which is a function of the engine speed. The temperature varying voltage is applied to one side of control winding 20, while a voltage which is a function of the engine speed is applied to the other side of winding 20.

In order to obtain the speed voltage, a speed signal from a tachometer generator 32 or other speed varying device, is fed to a bridge circuit 34. A tachometer generator is preferred since such generators are usually already present in aircraft. The output from a tachometer generator is an A.C. voltage which varies in both amplitude and frequency with speed. The preferred bridge circuit comprises capacitor 36, resistor 38, capacitor 40 and resistor 42. One corner of the bridge is grounded. Capacitors 36 and 40 are selected so that their individual capacitive reactances will equal the respective resistance values of resistors 38 and 42 at a preselected speed. Thus, the bridge will be balanced only at one speed.

The opposite corners of the bridge, junctions 37 and 41, are connected together by a rectifier 44, a resistor 46 and a rectifier 48. A resistor 50 and a resistor 52 are connected in series across resistor 46, the junction between resistors 50 and 52 being grounded. Resistors 50 and 52 are small compared with resistors 38 and 42, while resistor 46 is much smaller than resistors 50 and 52. A capacitor 54 is in parallel with resistor 50 and a capacitor 56 is in parallel with resistor 52. Capacitors 54 and 56 are much larger than capacitors 36 and 40. An adjustable tap 58 picks off a portion of the voltage across resistor 46 and feeds this voltage to control winding 20 of modulator 22. A rectifier 60 is connected between arm 58 and the control winding 20 and allows only negative voltages to be applied from the speed network to control winding 20. A source of D.C. voltage 62 is connected through a resistor 64 and a resistor 66 to ground. Resistor 64 is much larger than resistor 66 and provides a voltage essentially at ground level at the junction 68 between resistors 64 and 66. Resistor 64 is shown to be adjustable for varying the voltage at junction 68. Resistor 70 is connected between junction 68 and rectifier 60 to limit the current flow. A capacitor 72 acts to filter the signal which passes through rectifier 60.

When the tachometer generator 32 is at a preselected speed, bridge 34 is balanced and no voltage drop occurs across the bridge. If the engine speed decreases, junction 41 becomes more positive and junction 37 becomes less positive. In this condition, current will flow through rectifiers 44 and 48 providing a positive voltage drop across resistor 46. At low speeds and low frequencies, the capacitive reactance of capacitors 36 and 40 increases and most of the voltage drop between generator 32 and ground is across the capacitors. With a positive voltage across resistor 46, no voltage change will be produced at control winding 20 from the speed network because rectifier 60 is reverse biased and blocks the passage of any signal. The side of the control winding 20 connected with the speed network will thus remain near ground.

If the engine speed increases, the frequency of the A.C. signal from generator 32 also increases. With the increased frequency, the capacitive reactance of capacitors 36 and 40 decreases. Now most of the drop between generator 32 and ground is across resistors 38 and 42. Junction 37 now receives the larger voltage and junction 41 receives the smaller voltage. During positive half cycles, rectifier 44 conducts and capacitor 54 becomes charged to a positive voltage. During negative half cycles rectifier 48 conducts and capacitor 56 charges in the opposite direction from capacitor 54. Since junction 37 receives the higher absolute voltage, the negative charge on capacitor 56 will be larger than the positive charge on capacitor 54. A negative voltage will be maintained across resistor 46. Rectifier 60 will now be forward biased and will conduct, and junction 68, which was held essentially at ground by voltage source 62 and resistors 64 and 66, will now become negative.

It is thus apparent that at or below a preselected speed, the side of control winding 20 connected with the speed network will remain essentially at ground level. When the engine speed increases above the preselected speed, control winding 20 will receive a negative potential, the potential becoming more negative as the speed increases.

The arrangement described above assures that a voltage of only one polarity exists across control winding 20. As will become apparent, the necessity for this is that the indicator must be driven in only one direction. With the temperature signal held at ground or above, and the speed signal held at ground or below, the single polarity control voltage is provided.

When a voltage exists across control winding 20, it is modulated upon the 400 cycle A.C. supplied by exciter winding 24. The modulated signal is sensed by output winding 26 and amplified by A.C. amplifier 74. Motor 76, which is preferably an A.C. motor, is actuated in one direction only and produces movement of the indicator 78 through gearing 80 when the control signal indicates that the engine is operating above the limit. The indicator remains stationary when the motor is operating below the limit. Indicator 78 may be any type of device which will provide some indication of motor movement.

A rate feedback loop is incorporated to stabilize the system. A rate generator 82 is connected with motor 76. A generator 82 may be a typical tachometer generator. The A.C. output from generator 82 is fed to a non-linear compensation network 83. The compensation is required in order to match the non-linear time-temperature characteristics as determined by the engine curves to the response of the indicator. In other words, because the time-temperature curves are non-linear, and because the speed of the motor must be proportional to overtemperature, some attenuation must be introduced to achieve the desired results. It is most convenient to incorporate this attenuation or compensation into the feedback loop, but it should be understood that it is possible to include the compensation in the amplifier 74 or at some other portion of the system. The characteristics of the compensation network are adjusted at 100% safe engine speed so that the indicator travels from zero to 100% at each overtemperature in the length of time that the engine will operate at each overtemperature before it needs to be overhauled. The compensation network may be a simple resistor and diode arrangement which shunts a portion of the feedback signal to ground above or below a certain level.

After being compensated, the A.C. rate signal is demodulated by network 84 and the D.C. output fed to winding 30 of magnetic modulator 22 to complete the feedback loop.

In operation, arm 14 is adjusted to provide a voltage to control winding 20 which is proportional to engine temperature. The temperature voltage is always positive. Arm 58 is adjusted to provide a voltage to the other side of control winding 20 which is proportional to engine speed. This speed voltage is always at ground potential or lower. The temperature and speed voltages will produce a potential difference across control winding 20 which is always of one polarity. When this potential difference exceeds a specified value, motor 76 is actuated and indicator 78 is moved. The rate at which the indicator is moved is determined by the magnitude of the voltage across winding 20.

As indicated above, the potential difference across the winding 20 must reach a specified value before the indicator is moved. At 100% speed, a large negative voltage will appear at one side of the control winding 20. If the engine is operating at the temperature limit for 100% speed, a positive voltage will appear at the other side of winding 20. The potential difference across winding 20 will be insufficient at this point to actuate indicator 78. If the temperature increases, indicator 78 will be moved, since the potential difference across winding 20 will now exceed the maximum value. A decrease in engine speed will decrease the potential difference across winding 20. The speed voltage thus raises the temperature limit as the engine speed decreases below 100% to correspond to the characteristics of the curves.

Since the curves differ with particular engines, with environment, and with the type of operation, it may be desired to introduce additional attenuation to the speed and temperature circuits or to the amplifier in order to achieve the desired characteristics. The adjustable arms 14 and 58 and the adjustable resistor 64 which may be used to modify the voltage appearing across control winding 20 are sufficient to provide a sufficient operating range for most conditions. The bias applied to winding 28 may also be varied to control the point at which indicator 78 is actuated.

The indicator 78 is typically a counter which is set to some value, such as 100, when the engine is installed and which is turned backwards to indicate overhaul when zero is reached. It may be desired to install a warning light in the cockpit of the aircraft which is turned on when the counter has reached its limit, or when an overtemperature occurs. The concepts of the invention may also be combined with a fuel control system for regulating the flow of fuel to the engine in order to maintain the selected turbine temperature.

Other modifications of the invention are readily apparent to those skilled in the art and may be made without departing from the scope of the invention.

I claim:

1. Apparatus for determining the time for overhaul of a turbojet comprising:
    an indicator for recording cumulative engine overtemperature,
    a motor for actuating said indicator,
    means for producing a first signal proportional to actual engine temperature,
    means responsive to engine speed for producing a second signal indicative of maximum engine temperature at the speed of said engine,
    means for comparing said first and second signals, said means for comparing generating a control signal to actuate said motor when said actual temperature signal exceeds said maximum temperature signal by a preselected amount,
    means for varying said second signal in response to changes in speed of said engine,
    and circuit means responsive to the magnitude of engine overtemperature for varying the rate of movement of said indicator.

2. Apparatus for determining the time for overhaul of a turbojet engine comprising:
    an indicator for recording cumulative engine overtemperature,
    a motor for actuating said indicator,
    means for producing a first signal proportional to actual engine temperature,
    means for producing a second signal indicative of maximum safe engine temperature at 100% engine operating speed,
    means for comparing said first signal with said second signal, said means for comparing generating a control signal to actuate said motor when the difference between said first signal and said second signal exceeds a predetermined value,
    and means responsive to actual engine speed for varying said second signal to increase the maximum safe engine temperature as actual engine speed decreases below 100% speed.

3. Apparatus as in claim 2 and including compensation circuit means responsive to the magnitude of engine overtemperature for varying the rate of movement of said indicator.

4. Apparatus for determining the time for overhaul of a turbojet engine comprising:
    an indicator for recording the cumulative engine overtemperature in magnitude and time,
    a motor for actuating said indicator,
    circuit means for producing a first signal proportional to actual engine temperature,
    a tachometer generator connected with said engine for producing a second signal indicative of maximum engine temperature at actual engine speed, said first signal and said second signal being of opposite polarities,
    means for comparing said first and second signals to produce a control signal indicative of engine temperature relative to the engine speed,
    means connecting said control signal to said motor to actuate said motor only when said control signal is above a preselected value thereby indicating an overtemperature at the engine speed,
    a feedback circuit responsive to the movement of said motor for producing a feedback signal,
    means for combining said feedback signal with said control signal,
    and a compensation circuit connected in said feedback circuit for varying said feedback signal in response to the rate of motor movement to thereby vary the rate of movement of said indicator.

References Cited by the Examiner

UNITED STATES PATENTS

| | | | |
|---|---|---|---|
| 2,113,164 | 4/1938 | Williams | 318—29 |
| 2,159,236 | 5/1939 | Uher | 73—115 |
| 2,539,616 | 1/1951 | Gehman | 235—179 |
| 2,569,135 | 9/1951 | Trischka et al. | 235—178 |
| 2,574,438 | 11/1951 | Rossi et al. | 235—178 |
| 2,612,628 | 9/1952 | Hornfeck | 235—193 |
| 2,819,437 | 1/1958 | White | 235—193 X |
| 2,851,855 | 9/1958 | Gamble | 60—39.28 |
| 2,955,464 | 10/1960 | Elwell | 235—193 X |
| 2,965,300 | 12/1960 | Radley et al. | 235—193 |
| 3,064,422 | 11/1962 | Neher | 60—39.28 |
| 3,135,861 | 6/1964 | Burggren et al. | 235—193 X |

MALCOLM A. MORRISON, *Primary Examiner.*

K. W. DOBYNS, I. KESCHNER, *Assistant Examiners.*